United States Patent [19]

Watremez

[11] Patent Number: 5,612,110
[45] Date of Patent: Mar. 18, 1997

[54] MULTIMATERIAL DISK FOR HIGH-ENERGY BRAKING COMPRISING AN ASSEMBLY OF VARIOUS FLANGES

[75] Inventor: Michel Watremez, Marly, France

[73] Assignee: GEC Alsthom Transport SA, Paris, France

[21] Appl. No.: 409,588

[22] Filed: Mar. 24, 1995

[30] Foreign Application Priority Data

Mar. 25, 1994 [FR] France ................................ 94 03536

[51] Int. Cl.⁶ .................................................. F16D 69/00
[52] U.S. Cl. .................. 428/66.2; 188/251 R; 192/107; 428/64.1; 428/472; 428/614; 428/698; 428/701; 428/702
[58] Field of Search ................ 428/64, 472, 614, 428/698, 701, 702, 64.1, 66.1, 66.2; 192/107; 188/251

[56] References Cited

U.S. PATENT DOCUMENTS

| | | | |
|---|---|---|---|
| 4,180,622 | 12/1979 | Burkhard | 428/564 |
| 4,269,903 | 5/1981 | Clingman | 428/591 |
| 4,290,510 | 9/1981 | Warren | 428/564 |
| 4,542,111 | 9/1985 | Buran et al. | 501/127 |
| 4,546,052 | 10/1985 | Nicoll | 428/679 |
| 4,715,486 | 12/1987 | Burgdorf | 188/251 |
| 5,224,572 | 7/1993 | Smolen, Jr. et al. | 428/469 |

FOREIGN PATENT DOCUMENTS

| | | |
|---|---|---|
| 2631044 | 11/1989 | France . |
| 9007427.0 | 10/1991 | Germany . |
| 9307017.9 | 8/1993 | Germany . |
| 2268511 | 1/1994 | United Kingdom . |
| WO9208909 | 5/1992 | WIPO . |

OTHER PUBLICATIONS

*Database WPI*, Week 9218, Derwent Publications, Ltd., London, GB; AN 92–145264 & JP-A-4 081 491 (Hitachi Chemical).
French Search Report FR 9403536.

*Primary Examiner*—Nasser Ahmad
*Attorney, Agent, or Firm*—Sughrue, Mion, Zinn, Macpeak & Seas

[57] ABSTRACT

A multimaterial disk for high-energy braking comprises an assembly of various flanges. They comprise, in succession, a central flange and on either side of the central flange thermal barriers and outer flanges made up of a substrate faced on one side with a ceramic or cermet type facing.

21 Claims, 5 Drawing Sheets

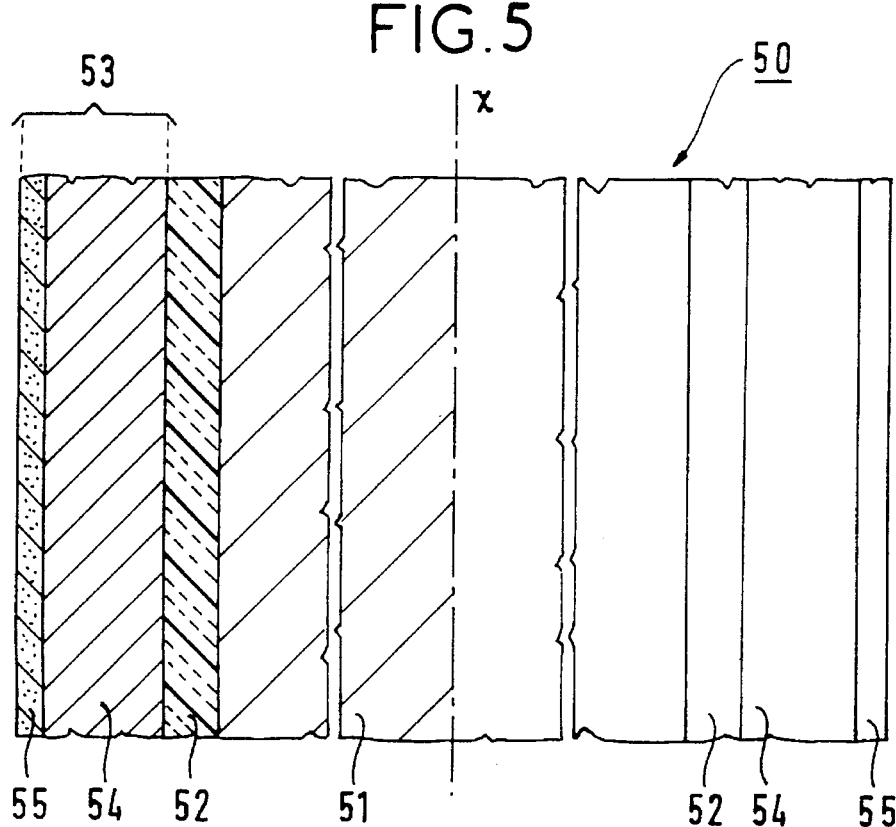
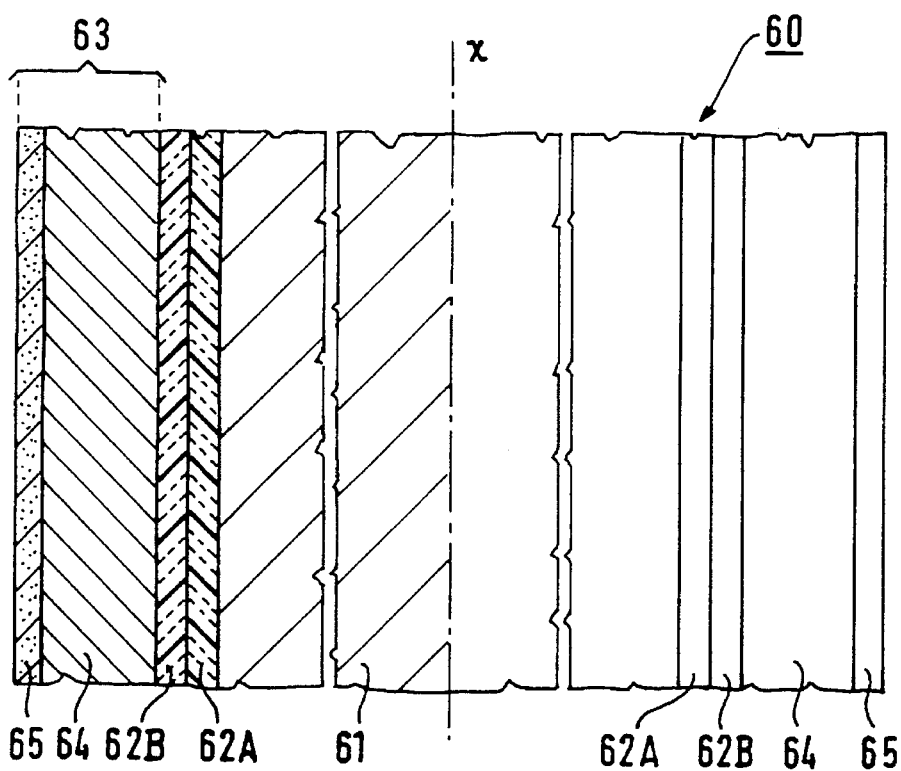

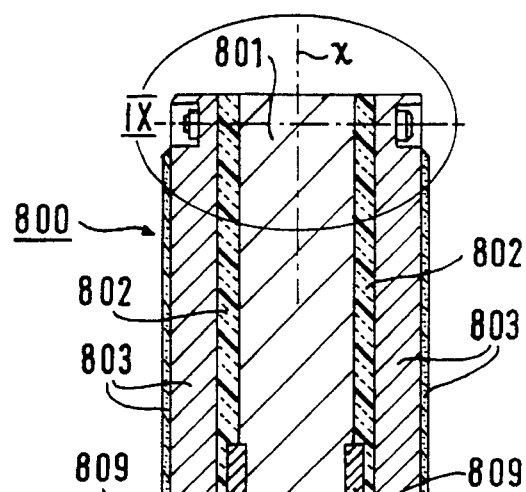
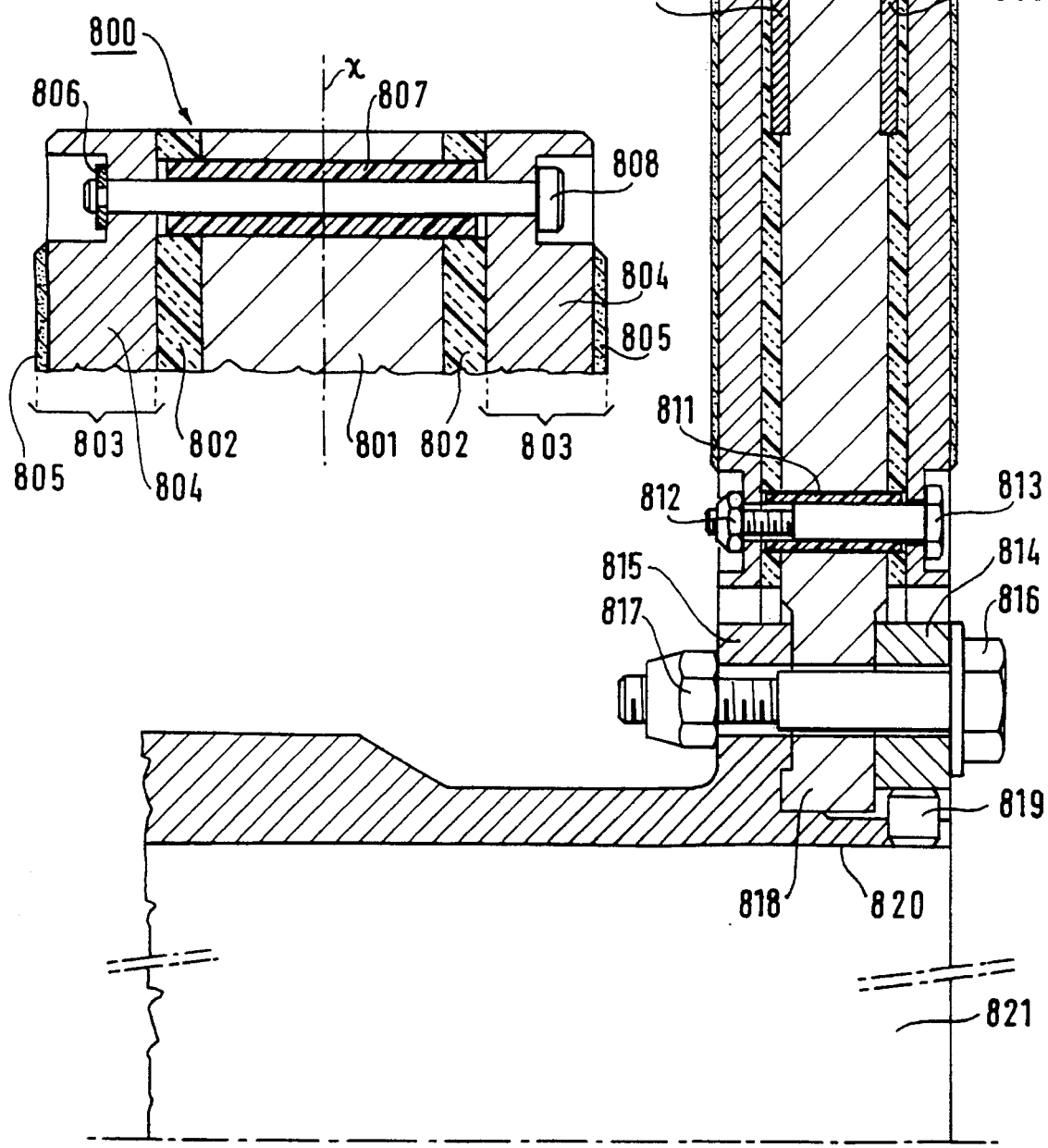
FIG. 8
FIG. 9

MULTIMATERIAL DISK FOR HIGH-ENERGY BRAKING COMPRISING AN ASSEMBLY OF VARIOUS FLANGES

BACKGROUND OF THE INVENTION

1. Field of the invention

The present invention concerns friction materials and their use in braking devices and, more particularly, a multimaterial disk for high-energy braking.

Optimizing the friction materials used in the braking systems of high-speed trains is proving increasingly difficult because of the huge amounts of energy to be dissipated. In this context of particularly active research, conventional solutions like the brake disks of the French "Atlantic" (TGV-A) high-speed train in conjunction with sintered iron-copper linings, for example, are currently reaching their limits and the maximum speed of 300 kph for passenger trains is due in part to our current inability to design braking systems of adequate performance. At very high speeds only friction brakes are capable of stopping a train.

2. Description of the prior art

Prior art braking devices employ, for example, a caliper device requiring the use of brake disks which are usually mounted on the axle.

In these devices, brake pads bite into the brake disks from both sides.

Optimizing the friction materials constituting certain parts of the braking devices of high-speed trains or other heavy vehicles is increasingly difficult because of the huge amounts of energy to be dissipated. This energy is proportional to the square of the speed and the mass in movement.

The magnitude of the energy to be dissipated is also high in the case of frequent braking, as in trains on underground railways, for example.

Prior art braking devices using TGV-A brake disks and sintered iron-copper facings, for example, are currently reaching their limits.

For example, each disk of the prior art braking devices on high-speed trains dissipates on the order of 14 MJ on braking from a speed on the order of 300 kph. The maximal energy that can be dissipated is on the order of 19 MJ.

The current target in the braking art is for each disk to dissipate around 25 MJ on braking from a speed on the order of 400 kph.

Ceramic brakes constitute an interesting alternative. Ceramic materials generally have high specific heat and mechanical strength at high temperature, good friction properties and in some cases good resistance to thermal shock. However, solid ceramics are very fragile with the result that it is not feasible to envisage a reliable brake disk of unitary construction. On the other hand, the use of a ceramic facing or insert seems more realistic from the reliability and cost points of view. Feasible options include multimaterial applications such as ceramic facings built up on the disk by spraying and disks comprising an assembly of various flanges with sintered ceramic linings. This technology, initially developed for trains (high-speed trains, trains which have to stop frequently, etc.), are susceptible to further development for other types of vehicles (heavy goods vehicles, etc.) likely to generate high levels of energy to be dissipated in a braking configuration or for any other braking application in which a stable coefficient of friction and little wear of the friction materials would be beneficial.

Friction braking raises the problem of dissipating the heat. The heat generated by braking near the wheel hubs must not be communicated to the wheel bearings which are sensitive to heat. Very intense heating may cause the wheel to lock up on its axle. Ceramic and cermet (ceramic-metal) facings or inserts are intended to limit the propagation of heat into the axle, to improve the wear resistance of the disk/lining combination and its resistance to thermal fatigue, and to offer stable friction characteristics at high temperature; this has led to the development of a new type of lining.

An object of the present invention is to propose a multimaterial disk for high-energy braking in high-speed trains using ceramic materials. The invention concerns only the disk which in all embodiments operates in conjunction with a ceramic lining as described in the prior art.

Another object of the present invention is to propose friction materials suitable for use in a brake disk and capable of limiting the propagation of heat into the axle.

Another object of the present invention is to propose friction materials suitable for use in a brake disk and capable of improving the wear resistance of the disk/lining combination.

Another object of the present invention is to propose friction materials suitable for use in a brake disk and capable of improving the resistance of the disk to thermal fatigue in combination with stable friction characteristics at high temperature.

In this document the term "cermet" is an abbreviation of "ceramic/metal" and refers to a ceramic-metal composite material.

SUMMARY OF THE INVENTION

The invention consists in a multimaterial disk for high-energy braking characterized in that it comprises an assembly of various flanges.

In accordance with the invention, the multimaterial disk has at least one of the following features:

it comprises in succession a central flange, thermal barriers on either side of said central flange and outer flanges comprising a substrate carrying a facing on one side, the central flange is made of aluminum alloy or from a composite material having an aluminum matrix, and/or the thermal barriers are made from a solid sintered ceramic material including zirconia or a thermally insulative ceramic material, and/or the substrates are made from steel, and/or the whole is constituted of a sublayer and/or a nickel-chromium/chromium carbide type ceramic-metal composite material, the thermal barriers are made from composite materials comprising a mixture of alumina or oxide ceramic fibers and an organic binder, the central flange includes thermal barriers deposited on its faces, the outer flanges include second thermal barriers deposited on one face.

The multimaterial disks for high-energy braking in accordance with the invention are preferably associated with a brake lining comprising studs of aluminum titanate or a different ceramic material.

In accordance with the invention the brake lining studs include approximately 54% alumina, approximately 33% titanium oxide, approximately 3% silica and approximately 2.5% magnesium oxide.

Simulation of high-energy braking using small disks have shown that the combination of an aluminum titanate lining and a disk faced with nickel-chromium/chromium carbide cermet constitutes a combination of materials which, in the braking configuration, offers interesting performance benefits from the points of view of the coefficient of friction and wear. Similarly, it has been demonstrated that the insertion of a thermal barrier leads to appreciable temperature gains within the thickness of the disk.

Other objects, features and advantages of the invention will emerge from a reading of the following description of preferred embodiments of the high-energy multimaterial disk given with reference to the appended drawings.

BRIEF DESCRIPTION OF THE DRAWINGS

FIG. 5 is a part-view in transverse section of a different embodiment of multipart multimaterial disk of the invention.

FIG. 6 is a part-view in transverse section of the multipart multimaterial disk from FIG. 5 incorporating an additional thermal barrier.

FIGS. 7 and 8 are a front view and a view in transverse section on the line VIII—VIII of a friction disk of the invention comprising an assembly of various flanges.

FIG. 9 shows the detail IX from FIG. 8.

DETAILED DESCRIPTION OF THE PREFERRED EMBODIMENTS

A first embodiment of the invention is concerned exclusively with the "facing" aspect and concerns a sprayed disk, i.e. a disk with facings sprayed on.

From the various deposition techniques available, atmospheric plasma spraying has been adopted because of the nature of the materials to be sprayed and the required layer thicknesses, in conjunction with economic considerations. Plasma spraying entails introducing solid particles into a plasma jet so that they melt before they impinge on the substrate where they form a deposit having a laminar structure.

Facing a disk is not an easy matter in that the facing must adhere perfectly to the substrate if it is to fulfill its functions correctly. The main problems are due to the nature of the chemical bonds between the ceramic and the substrate, the inherent fragility of ceramic materials and the difference between the Young's moduli and the coefficients of thermal expansion of the sprayed deposit and the substrate. During spraying liquid or semi-liquid particles spread over the substrate. The sprayed liquid particles penetrate into irregularities on the surface of the base material or previously deposited particles, transfer heat to the substrate, cool and solidify very quickly by contraction of the particles.

In the case of plasma sprayed facings, the adhesion and the cohesion of the deposit are essentially mechanical in nature and the preparation of the substrate is one of the most important phases as it conditions the adhesion of a deposit. In the present application sufficient roughness is achieved by sand-blasting the disk prior to spraying using 16 grade corundum (alumina oxide, mean grain diameter: 1 mm, pressure: 6 bars, Ra: 6 μm.

Rougher surfaces and surface modifications can be obtained by grooving, by electro-erosion, by laser treatment or by chemical treatment, carried out a few minutes before spraying in order to minimize the risk of oxidation.

Figure 1:
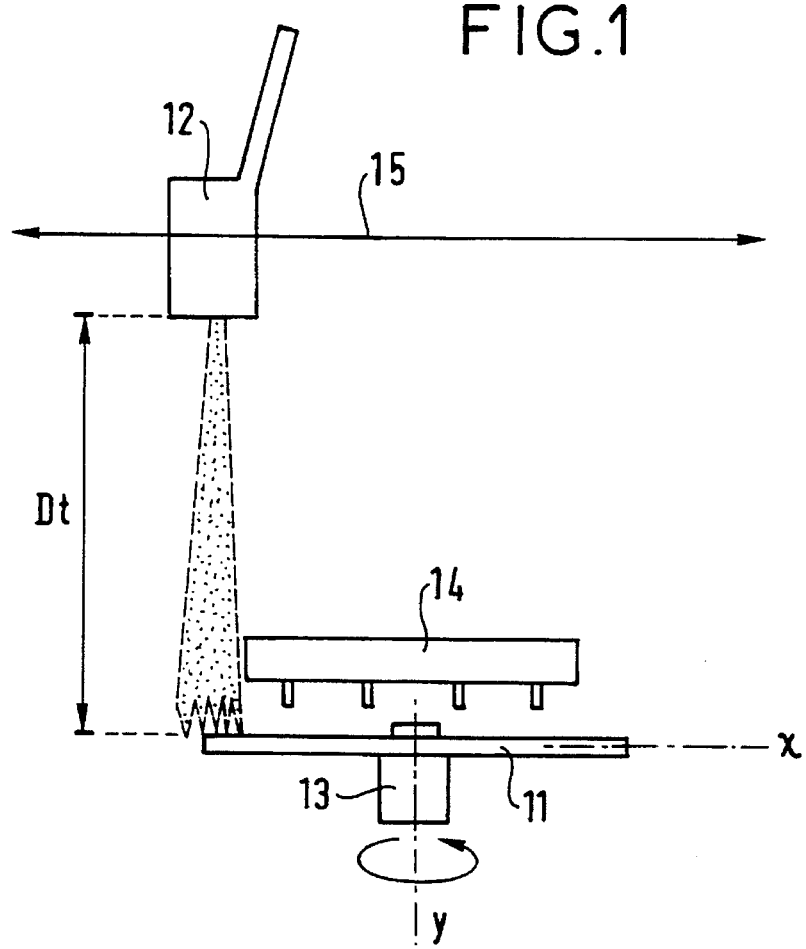
FIG. 1 shows the spray device for manufacturing the sprayed multimaterial disk of the invention.

To minimize residual stresses, FIG. 1 shows the spray device used in this application. The multimaterial disk 11 is rotated at constant speed about its revolution axis y by rotator means 13. A torch 12 at a distance Dt from the disk reciprocates parallel to an axis x, as shown by the double-headed arrow 15, at a speed which is controlled in accordance with the radius of the disk 11 so that the thickness of the facing obtained is constant. It is essential to control the spraying parameters and the cooling of disk 11 during spraying by cooling means 14.

A triplex coating 21 has been adopted to provide the functions as previously stated. Accordingly, an NiCrAlY bonding layer 23, a "yttrium-containing zirconia/NiCrAlY" composite thermal barrier layer 24 and a final chromium carbide based cermet friction layer 25 are deposited onto a substrate 22.

Figure 2:
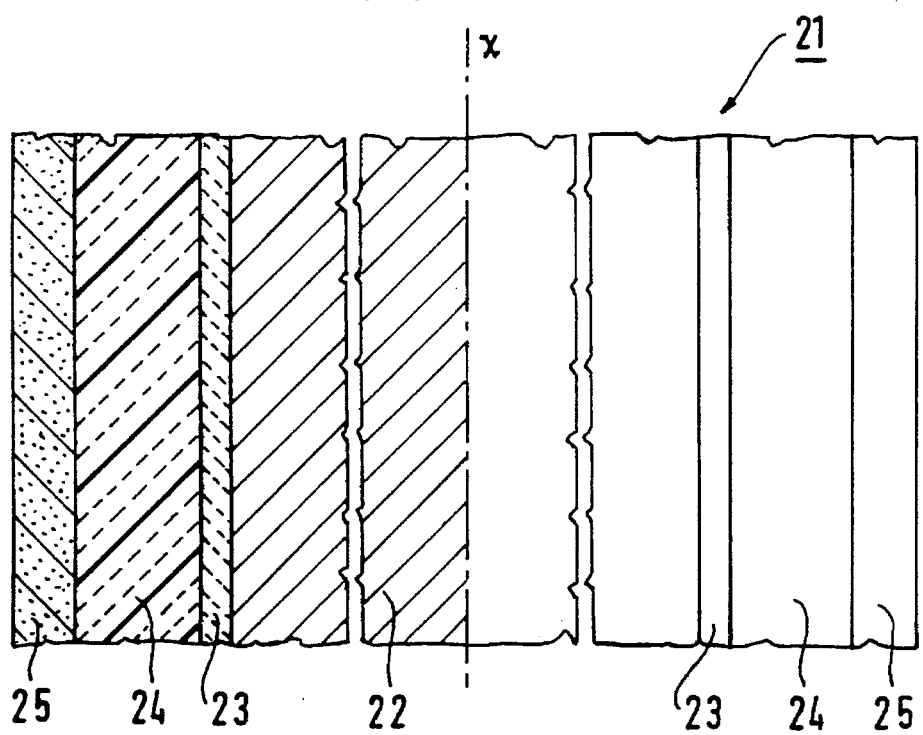
FIG. 2 is a part-view in transverse section of a multimaterial disk comprising a substrate and a sprayed triplex facing in accordance with the invention.

FIG. 2 shows one such structure of a multimaterial disk (21) with a triplex facing.

The structure shown in FIG. 2 is for a steel substrate 22 and in this case the powders sprayed have the compositions summarized in table 1.

| function | material | composition (by weight) | particle size |
| --- | --- | --- | --- |
| bonding | NiCrAlY | nickel: 70% chromium: 20% aluminum: 9% yttrium: 0.27% | 45–125 μm |
| thermal barrier | yttrium-containing zirconia/NiCrAlY composite material (proportions: 25/75 by volume) | NiCrAlY: ditto yttrium-containing zirconia: zirconia: 85% yttrium: 8% | 45–70 μm |
| friction-wear | Nickel/chromium-chromium carbide cermet | chromium carbide: 75% nickel-chromium: 25% of which: nickel: 80% chromium: 20% | 10–90 μm |

It is feasible to apply this facing to any type of cast iron or steel substrates 22.

For high-energy braking applications, it is not feasible to use aluminum alloys for the substrate 22 because of their low maximum operating temperature, above which their mechanical properties are severely degraded. On the other hand, if the intended application concerns lower energy braking and this technique is of interest because of the tribological aspect (coefficient of friction and wear), it is entirely feasible to spray the nickel-chromium/chromium carbide cermet onto aluminum alloy, with or without a thermal barrier. In this case a graduated bonding layer 23 is required to reduce the difference between the coefficients of thermal expansion. The second embodiment described later exploits the lightness of aluminum alloy to reduce significantly the weight of the axles.

For high-energy braking applications it is feasible to use for the substrate 22 a composite material comprising an aluminum matrix reinforced with fibers (carbide or oxide); these materials retain their mechanical properties at higher temperatures.

The bonding layer 23 is not indispensable but improves adhesion to the substrate 22 and to the topmost deposit 24. With no bonding layer 23 the adhesion is essentially mechanical but with a bonding layer 23 a small area of diffusion can be observed. Bonding alloys are materials with increased resistance to oxidation and corrosion which can reduce oxidation at high temperatures likely to occur because of the heating that occurs on braking. The bonding layer also minimizes the difference between the coefficients of thermal expansion of the substrate 22 and the second sprayed layer, i.e. the thermal barrier 24. Other alloys, for example aluminum/nickel, can be used as the bonding layer but do not provide so good a barrier to oxidation as an MCrAlY alloy (where M represents nickel or cobalt) more often used for the bonding layer.

Zirconia-based deposits are most frequently used in industry as thermal barriers because of their low thermal conductivity and their relatively high coefficient of thermal expansion. However, braking configuration tests have shown up the superior reliability of composite facings which have better adhesion to the substrate and greater cohesion. These materials are "metal-ceramic" composites of the NiCrAlY-zirconia type having significantly better mechanical properties than zirconia combined with reduced sensitivity to thermal shock and virtually the same "thermal barrier efficacy", although the use of pure yttrium-containing zirconia or any other insulative oxide ceramic (aluminum titanate, alumina, etc.) is possible. Increasing the thickness of the deposit reduces its resistance to thermal fatigue, and it is therefore necessary to find the best possible compromise between thermal insulation and thermal fatigue resistance, depending on the braking configuration concerned. This is equally valid for the friction layer 25 whose thickness is optimized to suit the essentially thermal stresses generated in the intended braking application. The particle size given in table 1 is merely indicative. Depending on the application, there may be particular benefit in using powders with smaller or larger particles. The use of large diameter particles reduces the level of residual stresses and increases porosity. High porosity is beneficial for resistance to thermal shock but facilitates penetration by corrosive elements, leading to corrosion and oxidation of the substrate due to the effect of thermal cycling; once again the best compromise for the intended application has to be found.

With regard to application of the facings, in addition to the atmosphere or other plasma torch (low-pressure plasma, controlled temperature atmosphere plasma), it is possible to use other flame spraying techniques (including supersonic and hypersonic sprayguns) and laser methods. The various layers can also be applied by combinations of the various deposition technologies; hypersonic spraying produces deposits that are more dense than with the plasma technique and can be advantageous for the friction layer, which is then less sensitive to wear, although it is not feasible to form the thermal barrier layer using this technique; paradoxically, the best results in terms of adhesion are obtained by forming the various layers continuously and gradually (requiring more than one powder dispenser) to limit oxidation between the layers and to reduce the differences between the characteristics of the materials sprayed. From this point of view, it seems preferable to use post-spraying treatment rather than a combination of processes.

A number of post-spraying treatments may prove necessary to increase the service life of such devices, especially in braking applications generating extremely high levels of energy. The use of heat treatment in an inert environment (diffusion treatment) to relieve residual stresses improves adhesion by creating a diffusion area at the interface between the bottom layer and the substrate and at the various other interfaces in the case of a multilayer facing. Laser surface treatment can be used to remelt a previously deposited facing. Remelting can also be brought about by introducing into the densified deposit other particles of a different nature, to obtain different surface characteristics (higher or lower coefficient of friction, for example). This treatment changes the microstructure of the deposits to render them more dense and to reduce residual stresses. Laser surface remelting produces a surface facing that is dense, smooth, with a homogeneous fine microstructure and having improved thermomechanical properties. Under this layer, which is around 100 µm to 200 µm thick, the deposit remains in the form obtained by plasma spraying. The result of this treatment, as compared with "raw plasma" deposits, is increased wear resistance and improved resistance to thermal shock.

As the deposits are laid down they can be reinforced with fibers (carbide or oxide), in particular to improve their resistance to thermal shock.

In connection with an application to high-speed trains, braking simulations have been carried out on small 28CDV5-0.8 steel disks in conjunction with Jurid 721 iron-copper sintered linings, i.e. the materials used on the TGV-A high-speed train. The same tests on faced disks (0.1 mm bonding layer+0.5 mm thermal barrier+0.5 mm friction layer) showed highly unstable coefficients of friction. Insertion of the thermal barrier reduces temperatures in the disks, as would be expected, but also increases the temperature in the linings, which then wear very severely. Thus optimizing a brake disk cannot be dissociated from optimizing the lining. By increasing the transfer of heat to the lining, thermal barrier brake disks impose the need for a new generation of linings. Ceramics have stable thermomechanical characteristics at high temperature and the use of aluminum titanate linings with disks having a surface facing of nickel-chromium/chromium carbide cermet produces an unusually stable coefficient of friction, regardless of the speed or the power concerned, and distributes the heat generated at the interface more equally.

Referring to the application to high-speed trains with linings comprising cylindrical sintered iron-copper studs, aluminum titanate studs have been made by isostatic pressing. They comprise 54% alumina, 33% titanium oxide, 3% silica and 2.5% magnesium oxide, for example. This composition can be modified to adjust their tribological behavior. Compared to sintered metal studs, ceramic studs are lighter in weight and less costly to manufacture.

In the braking configuration, these friction materials produce less wear and more regular wear as compared to the "28CDV5/sintered Fe-Cu lining" combination currently used. In the case of ceramics, the mechanism of wear by the release of debris is often followed by a high-temperature glazing phenomenon which forms a very hard surface layer about one micron thick. From the practical point of view, this glazing gives the "nickel-chromium/chromium carbide cermet/aluminum titanate" combination good wear resistance and a stable coefficient of friction.

Because of the very low thermal conductivity of aluminum titanate, the use of this lining necessarily increases the surface temperature of the disk (for equal braking power). Adding a thermal barrier between the substrate and the friction layer further increases surface temperature slightly, but the thermal barrier produces lower temperatures within the substrate. Depending on the application, it is necessary to optimize the thickness of the thermal barrier to obtain satisfactory distribution of the heat due to braking between the disk and the lining. The surface temperature is also increased in this situation because the thermal barrier layer is very close to the friction surface. The second embodiment described later overcomes this handicap.

Apart from aluminum titanate, other ceramic materials produced by isostatic pressing or otherwise (uniaxial pressing, casting, extrusion or injection molding) may be suitable, subject to experiments to determine their tribological characteristics in the braking configuration.

Regardless of the friction disk concerned (highspeed train or otherwise), application of the facing does not require any modification to the design, as this technology merely involves depositing different materials on the surface.

The studs of current TGV-A high-speed train linings are sintered in grids and then welded to a metal base in turn welded to the support plate. In the case of ceramic studs it is no longer possible to weld them directly in place.

Figure 3:
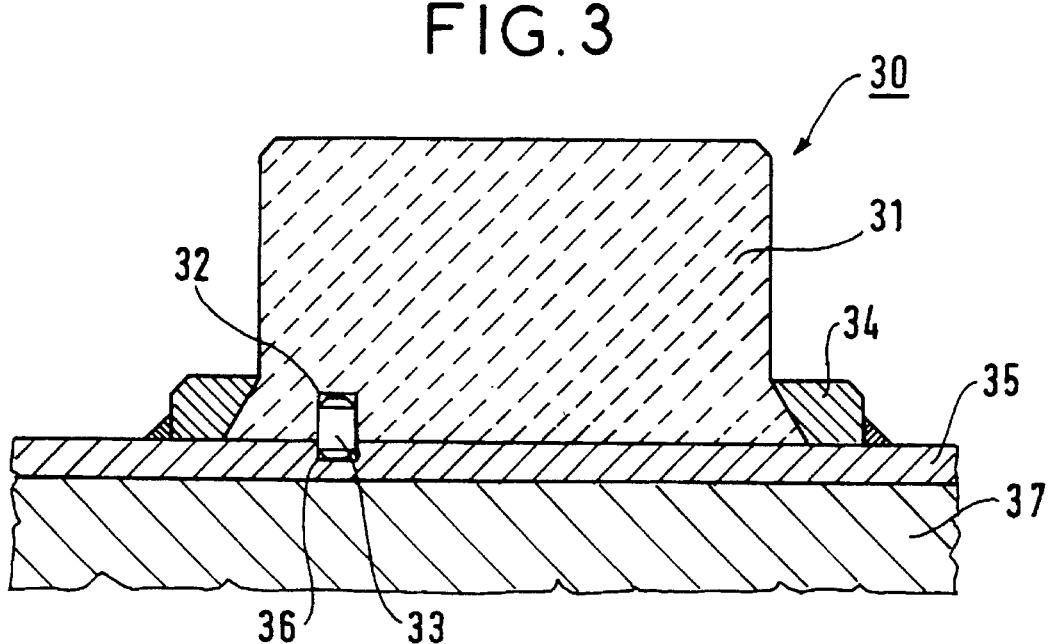
FIG. 3 shows one way of fixing ceramic studs of the linings.

FIG. 3 shows one possibility for fixing the studs 31 of a lining 30. After sintering, a stud 31 is machined in the conventional way to produce a conical base portion. A centering pin 33 accommodated in housings 32 and 36 prevents the stud from rotating. A ring 34 made of stainless steel, for example, has a conical inside surface. This ring 34 is fitted to the stud 31 and then welded to a support plate 35 attached to a dovetail 37 fitting the lining application device (not shown) to fix the stud 31.

Apart from the technical benefits described above, this technology has significant economic benefits. Regardless of the railroad rolling stock or other plant concerned, current brake disks are relatively costly. For example, the disks for the TGV-A high-speed train are made from 28 CDV 5-0.8 steel, which is an alloy steel with a high elastic limit, and are treated to obtain a track hardness of 370 HB, entailing high costs.

The economic advantage of the method is that costly materials are used only where they are needed with the bulk of the material being a steel of moderate characteristics; the faced disks can be recycled when worn down by using special tools (faced tools, for example) to remove the worn deposit and spraying new materials onto the recovered disk. It is not feasible to remove only the friction layer and greater reliability is achieved by replacing the entire facing.

A second embodiment of the invention relates to a multipart disk which, as previously mentioned, can combine (and even improve on, in terms of thermal transfer) the technical benefits of the first embodiment as well as significantly reducing the weight of the friction disks. This design should yield a weight saving in the order of 40% per disk as compared with a monobloc steel disk.

This second embodiment entails a disk comprising an assembly of various flanges. To use aluminum alloys in braking applications it is necessary to keep temperatures to reasonable levels in order to preserve their mechanical characteristics, even in the case of aluminum matrix/reinforcing fiber composite materials.

Figure 4:
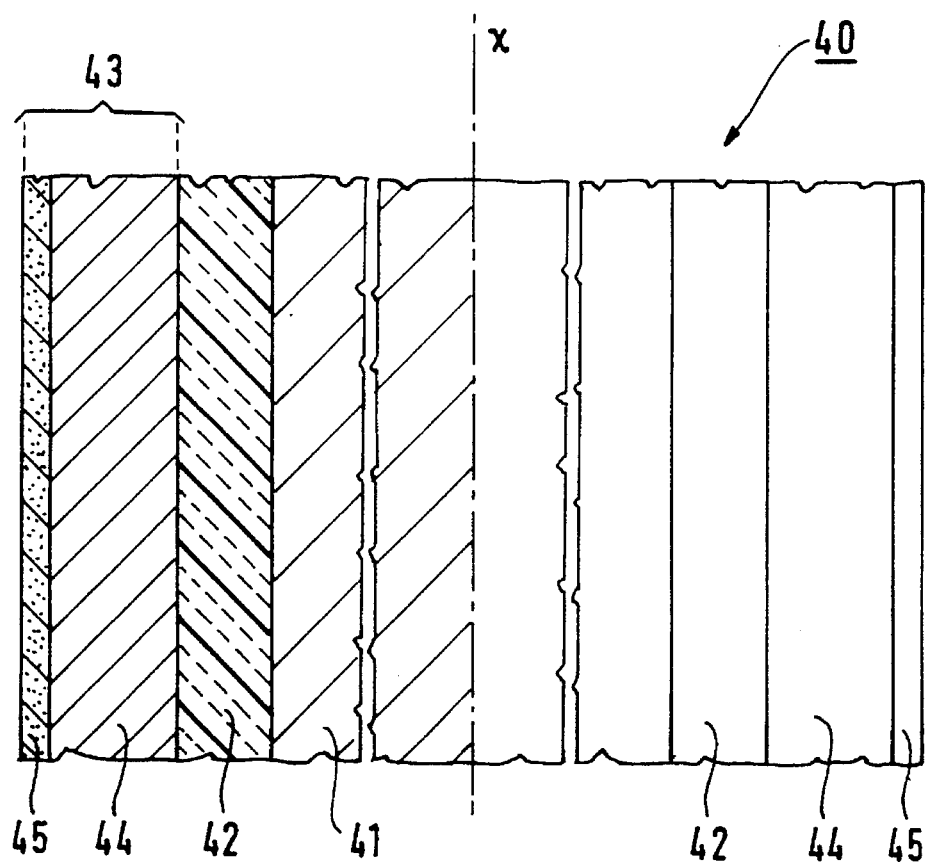
FIG. 4 is a part-view in transverse section of an assembled multimaterial disk of the invention.

As shown in FIG. 4, the multimaterial disk 40 is in four parts.

A central flange 41 is connected directly to the axle. Intermediate flanges 42 provide thermal barriers and, by bringing about a substantial decrease in temperature, enable the use of an aluminum alloy central disk 41. These isolating flanges 42 are made of sintered zirconia and are therefore solid.

Other similar ceramic materials could be used, for example alumina, titanate, produced by conventional methods (uniaxial or isostatic pressing, casting, injection molding or even extrusion). It is also possible to use composite materials comprising a mixture of fibers (often aluminum fibers) and an organic binder; like conventional solid ceramics, these materials can be machined without difficulty and, compared to the latter, have significantly lower thermal conductivity combined with comparable resistance to thermal shock and thermomechanical properties.

Outer flanges 43 comprise a steel substrate 44 faced on one side with nickel-chromium/chromium carbide cermet 45 which if appropriate is deposited onto a sublayer. Used in conjunction with aluminum titanate linings (not shown), the outer flanges 43 yield the tribological advantages (stable coefficient of friction, low and regular wear, facility to adjust the coefficient of friction) described with reference to the first embodiment.

Having the thermal barrier farther from the interface limits the temperature rise at the friction surfaces and therefore wear of the antagonistic materials as compared with the first embodiment. The thicknesses of the intermediate flanges 42 and the unfaced outer flanges 43 are optimized to suit the intended braking application; the aim is to obtain a temperature drop at the interfaces 42/41 which is large enough to allow the use of aluminum alloy whilst minimizing the temperature at the rubbing surfaces.

A variant using two types of flange could deposit a thermal barrier 52 onto an aluminum alloy central flange 51. FIG. 5 shows a multimaterial disk 50 of this kind. As described previously, an outer flange 53 comprises a substrate 54 carrying a facing 55 on one side.

As mentioned in connection with the first embodiment of the invention, the thermal barrier is thin. In the case of an application to very high energy braking, the thickness of this thermal barrier may be insufficient and consideration can be given to providing a second thermal barrier 62B on an outer flange 63, in addition to a first thermal barrier 62A on a central flange 61. FIG. 6 shows a multimaterial disk 60 of this kind.

Figure 7:
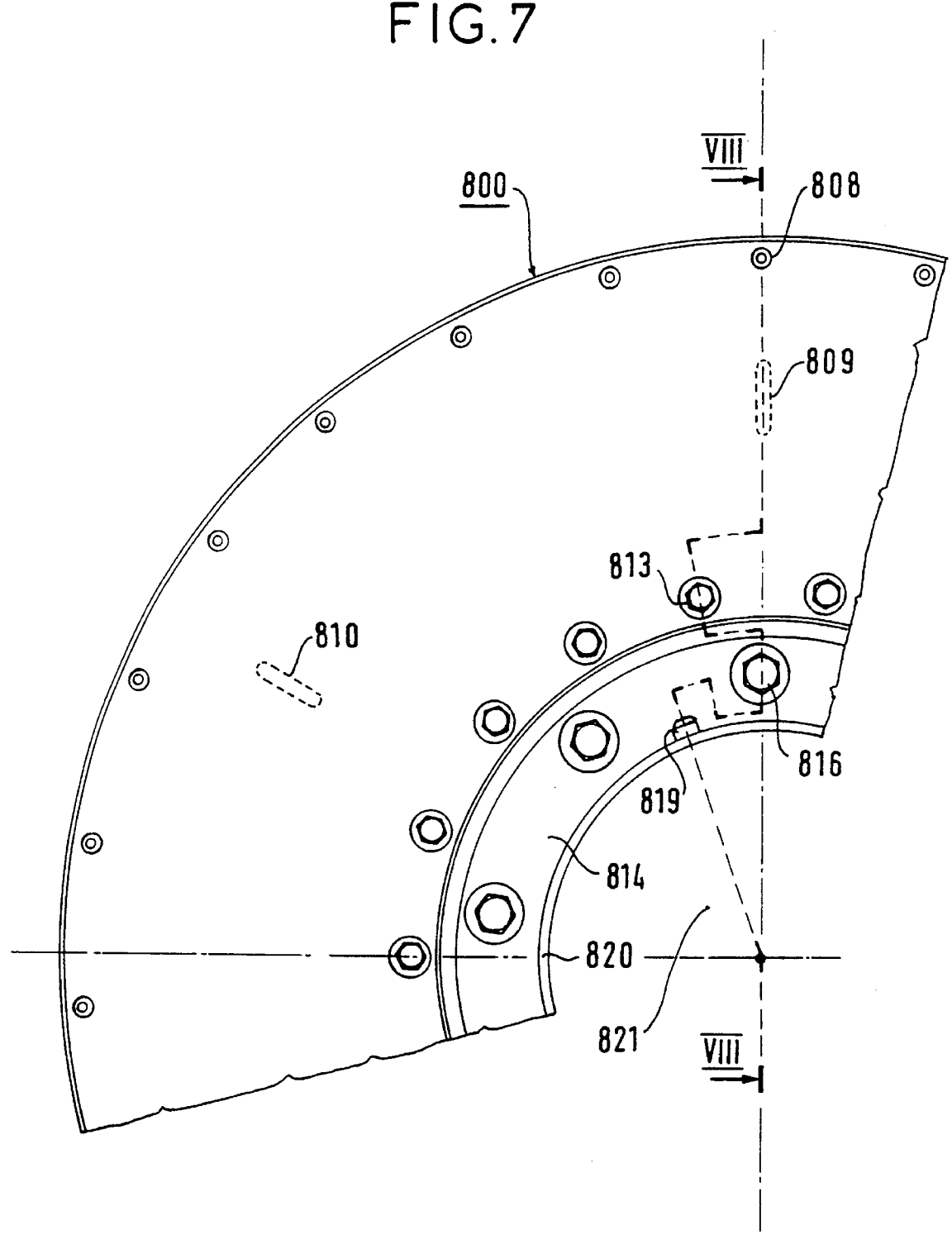

As compared to the first embodiment, friction disks comprising an assembly of various flanges require a special design process. For example the description will relate to a friction disk 800 mounted on an axle 821 of a TGV-Atlantic type high-speed train bogie (FIGS. 7 and 8).

The intermediate flanges 802 and external flanges 803 are attached to the central flange 801 before the latter is fixed to the axle 821 by means of a hub 820. The facing flanges 802, 803 are held together by bolts 813, self-locking nuts 812 at the bottom and, for example, a system of pins and clips 806/808 at their outside periphery. These flanges are rotated with the central flange 801 by keys 809 and 810 inserted into housings between the flanges.

The hub 820 is sintered onto the axle 821 and receives the friction disk 800 comprising an assembly of the various flanges 801–803.

The aluminum alloy central flange 801 is attached to the hub 820 by a heel joint 818. The heel 818 fits under the axial abutment 815 of the hub 820. A centering lug 819 locates in a housing provided for it in the hub and prevents the ring 814 rotating. The aluminum alloy central flange 801 to which the other flanges 802, 803 are attached is fixed by bolts 816 and self-locking nuts 817. Ceramic bushings 807 and 811 isolate the external flanges 803 from rubbing against the aluminum alloy central flange 801.

As previously described, the outside flange 803 comprises a substrate 804 and a facing 805.

The fabrication of a multipart disk is more costly than that of a faced monobloc disk but apart from the saving in weight which leads to many other savings (noise, vibration, etc.), the thermomechanical and tribological (friction and wear) performance is superior to that of the faced monobloc disk design, which can be particularly advantageous in the case of very high energy braking.

As previously stated, the first embodiment necessitates renewal of all of the facing if the substrate is re-used. The "multipart disk" design enables the outer flanges to be refaced after preparation (machining to remove the worn facing followed by sandblasting), but the thermal barrier does not have to be remade. The intermediate flanges, of more costly construction, and the central flange do not have to be changed.

There is claimed:

1. A multimaterial disk for high-energy braking comprising an assembly of flanges and including in succession a central flange, thermal barriers on either side of said central flange, and outer flanges each comprising a substrate having an inner side disposed on a corresponding one of said thermal barriers and an outer side carrying a facing, wherein said thermal barriers are made from composite materials comprising a mixture of oxide ceramic fibers and an organic binder.

2. The multimaterial disk according to claim 1, wherein said central flange is made from one of aluminum alloy and from a composite material having an aluminum matrix.

3. The multimaterial disk according to claim 1, wherein each substrate is made from steel and said facing is constituted of a sublayer and a nickel-chromium/chromium carbide ceramic metal composite material.

4. The multimaterial disk according to claim 1, wherein said thermal barriers are deposited on the faces of the central flange.

5. The multimaterial disk according to claim 1, wherein each of said outer flanges includes a second thermal barrier deposited on said inner side.

6. The multimaterial disk according to claim 1, associated with a brake lining comprising studs formed of a ceramic material comprising aluminum titanate.

7. The multimaterial disk according to claim 6, wherein said brake lining studs have a composition by weight of approximately 54% alumina, approximately 33% titanium oxide, approximately 3% silica and approximately 2.5% magnesium oxide.

8. A multimaterial disk for high-energy braking comprising an assembly of flanges and including in succession a central flange, thermal barriers on either side of said central flange, and outer flanges each comprising a substrate having an inner side disposed on a corresponding one of said thermal barriers and an outer side carrying a facing, wherein said thermal barriers are made from composite materials comprising a mixture of alumina fibers and an organic binder.

9. The multimaterial disk according to claim 8, wherein said central flange is made from one of aluminum alloy and from a composite material having an aluminum matrix.

10. The multimaterial disk according to claim 8, wherein each substrate is made from steel and said facing is constituted of a sublayer and a nickel-chromium/chromium carbide ceramic metal composite material.

11. The multimaterial disk according to claim 8, wherein said thermal barriers are deposited on the faces of the central flange.

12. The multimaterial disk according to claim 8, wherein each of said outer flanges includes a second thermal barrier deposited on said inner side.

13. The multimaterial disk according to claim 8, associated with a brake lining comprising studs formed of a ceramic material comprising aluminum titanate.

14. The multimaterial disk according to claim 13, wherein said brake lining studs have a composition by weight of approximately 54% alumina, approximately 33% titanium oxide, approximately 3% silica and approximately 2.5% magnesium oxide.

15. A multimaterial disk for high-energy braking comprising an assembly of flanges and including in succession a central flange, thermal barriers on either side of said central flange, and outer flanges each comprising a substrate having an inner side disposed on a corresponding one of said thermal barriers and an outer side carrying a facing, wherein said thermal barriers are flanges made from a solid sintered ceramic material including one of zirconia and a thermally insulative ceramic material.

16. The multimaterial disk according to claim 15, wherein said central flange is made from one of aluminum alloy and from a composite material having an aluminum matrix.

17. The multimaterial disk according to claim 15, wherein each substrate is made from steel and said facing is constituted of a sublayer and a nickel-chromium/chromium carbide ceramic metal composite material.

18. The multimaterial disk according to claim 15, wherein said thermal barriers are deposited on the faces of the central flange.

19. The multimaterial disk according to claim 15, wherein each of said outer flanges includes a second thermal barrier deposited on said inner side.

20. The multimaterial disk according to claim 15, associated with a brake lining comprising studs formed of a ceramic material comprising aluminum titanate.

21. The multimaterial disk according to claim 20, wherein said brake lining studs have a composition by weight of approximately 54% alumina, approximately 33% titanium oxide, approximately 3% silica and approximately 2.5% magnesium oxide.

* * * * *